(12) United States Patent
Van Den Bogart et al.

(10) Patent No.: US 8,870,072 B2
(45) Date of Patent: Oct. 28, 2014

(54) CARD FEED UNIT, READ OUT UNIT, ATM AND METHOD

(75) Inventors: Leonardus Antonius Maria Van Den Bogart, Utrecht (NL); Cornelis Johannes Goedee, Utrecht (NL); Marina Helena De Jongh, Utrecht (NL)

(73) Assignee: Card Swipe Protection Technology B.V., Utrecht (NL)

( * ) Notice: Subject to any disclaimer, the term of this patent is extended or adjusted under 35 U.S.C. 154(b) by 0 days.

(21) Appl. No.: 13/260,031

(22) PCT Filed: Mar. 22, 2010

(86) PCT No.: PCT/NL2010/050147
§ 371 (c)(1),
(2), (4) Date: Dec. 19, 2011

(87) PCT Pub. No.: WO2010/110659
PCT Pub. Date: Sep. 30, 2010

(65) Prior Publication Data
US 2012/0080518 A1 Apr. 5, 2012

(30) Foreign Application Priority Data

Mar. 27, 2009 (NL) ..................................... 2002677
Aug. 25, 2009 (NL) ..................................... 2003394

(51) Int. Cl.
G06K 7/08 (2006.01)
G06K 13/08 (2006.01)

(52) U.S. Cl.
CPC .................................. G06K 13/0843 (2013.01)
USPC ............................ 235/451; 235/449; 235/439

(58) Field of Classification Search
USPC .................................. 235/451, 449, 379, 439
See application file for complete search history.

(56) References Cited

U.S. PATENT DOCUMENTS

| 6,176,426 B1 * | 1/2001 | Kanayama et al. | 235/449 |
| 7,077,315 B2 * | 7/2006 | McCance | 235/449 |
| 7,401,736 B2 * | 7/2008 | May | 235/449 |
| 7,607,580 B2 * | 10/2009 | Takita et al. | 235/451 |
| 8,251,282 B2 * | 8/2012 | Clark et al. | 235/380 |
| 2004/0026507 A1 | 2/2004 | Nagata et al. | |

(Continued)

FOREIGN PATENT DOCUMENTS

| WO | 0184486 A1 | 11/2001 |
| WO | 2005001598 A2 | 1/2005 |
| WO | 2007032964 A2 | 3/2007 |

*Primary Examiner* — Ahshik Kim
(74) *Attorney, Agent, or Firm* — The Webb Law Firm

(57) ABSTRACT

The present invention relates to a card feed unit for transferring a data carrier of card information of a multi-services cards, such as a bank card or credit card, to a reading head of a reading unit for at least reading out of card information, the card feed unit comprising: attachment means for attaching the card feed unit in an arrangement respective of the reading head that is suitable for transporting the data carrier of the card in the direction of the meeting head, a receipt position for receipt of the card, a transfer assembly for transferring the card by means of the transfer assembly in the direction of the reading head, in which: the card feed unit is suitable for, during insertion of the card in the receipt position, receiving the card in the receipt position by means of an insertion operation with a direction of movement that, at least as seen in one direction, is substantially perpendicular to the readout direction of the card for preventing that the card is readable during the insertion operation.

24 Claims, 12 Drawing Sheets

(56) References Cited

U.S. PATENT DOCUMENTS

| | | |
|---|---|---|
| 2004/0173677 A1* | 9/2004 | Lucas et al. ............... 235/440 |
| 2007/0228178 A1 | 10/2007 | Rakoff et al. |
| 2008/0191860 A1 | 8/2008 | Flook et al. |
| 2010/0096456 A1* | 4/2010 | Rodrigues ............... 235/439 |

* cited by examiner

CARD FEED UNIT, READ OUT UNIT, ATM AND METHOD

BACKGROUND OF THE INVENTION

The present invention relates to a card feed unit for safely performing card feed operations for feeding a card into automated transactions machines. The present invention also relates to a read out unit comprising a card feed unit. The present invention also relates to a transaction machine, such as a payment machine or a cash drawing machine ATM, comprising a card feed unit. The present invention also relates to a method for safely performing of transactions while applying a card feed unit and or a machine.

Within the scope of this text, the following definitions apply.

Card information is intended to mean information storable in a data carrier to be read by the card reader, such as for performing card transactions.

A direction substantially perpendicular to the reading direction of the card means that the direction is substantially excluding a direction running parallel to the reading direction of a card. Therefore, the direction substantially perpendicular to the reading direction of the card may have at least two directional components that are not parallel to this reading direction. If the reading direction is generally in the direction of an X-axis, 2 directional components substantially perpendicular to the reading direction may comprise direction components generally in the direction of a Y-axis, and or a Z-axis or a combined direction of movement.

The use of magnetic data storage card has become ubiquitous throughout the world. Examples of such cards include credit cards, debit cards, bank cards, ATM cards, security guards, identity cards, driver licenses, etc.

Such a card has standardized shape and dimensions, and stores the data in parallel tracks within a magnetic strip. The location and orientation of the strip on the card are also standardized. In operational use, the data stored in the magnetic strip of the card is read by swiping or otherwise transporting the card past a reading head of a card reader in the user interface of a computerized secure system. The user interface typically has a card slot that is dimensioned in order to have the card inserted in such an orientation that the magnetic strip is transported past the reading head by the user's inserting the card. The system processes the data thus read together with a personal identification number (PIN) or other password, entered by the card's owner into the system via a keyboard and/or touch screen in the system's user interface.

The term "skimming" refers to the theft of secure information stored in the magnetic strip of a credit card, a debit card, a bank card, ATM card, a security card, an identity card, etc., while the card is being used in a normal legitimate transaction. In a practical scenario, a thief places a small electronic device, referred to as a "skimmer", at or over the card feed slot of an ATM. For example, a skimmer is accommodated in a false front overlying the card slot of a dip card reader or of a motorized reader. As another example, a skimmer is positioned within or at one or at both extremities of the channel of a swipe card reader, e.g., by means of using a false front cover accommodating the skimmer's reading head. The channel is wider at the extremity than at the position of the reading head so as to facilitate feeding the card into the channel him being swiped. The skimmer reads the magnetic strip as the user unknowingly passes his/her card through it. These skimming devices are often used in conjunction with a pinhole camera to read the user's PIN at the same time. The skimming device stores the data read or instantly transmits the data via a wireless connection to the thief. The information thus stolen can then be used by the thief to assume the card owner's identity for, e.g., obtaining goods without paying, withdrawing money from the card owner's bank account, obtaining access to gated premises, etc.

Various approaches to protection against skimming are known.

US patent application publication 2008/0191860 relates to a security system useful for monitoring an automated teller machine (ATM). The system includes a camera that provides images of at least selected portions of the ATM. A controller automatically determines whether a difference between a reference image of the ATM and a subsequently acquired image from the camera indicates an alteration to the ATM. One example provides the ability to detect whether a skimming reader has been placed adjacent a card receiving slot. An embodiment includes acquiring a plurality of reference images corresponding to different lighting conditions and using an appropriate one of the reference images based upon a lighting condition or time of day associated with a subsequently acquired image.

US patent application publication 2007/0228178 relates to a card reader housing that has an exterior surface configuration that includes a plurality of distinct surface portions aligned at oblique angles relative to each other. The exterior surface configuration prevents the placement of a skimming reader over the top of the card reader housing. In an example, a finger-receiving notch is directly aligned with a reader and has a depth and a dimension sized for receiving at least a portion of a finger holding a card inserted into a slot in the housing. Any alteration of the notch dimensions prevents proper operation of the card reader.

WO 2007/032964 relates to an anti-skimming reader for an automated banking machine. In order to prevent a magnetic sensor of an unauthorized skimming device from reading the magnetic information from the card, the card reader moves the card with motions which interfere with the ability of an unauthorized magnetic sensor to accurately read information from the card.

WO 2005/001598 relates to an automated banking machine. Sensing devices adjacent a card reader slot on the machine enables a controller to detect the presence of a fraud device or unauthorized card reading devices. Sensing devices adjacent a keypad enable the controller to detect the presence of an unauthorized manual input intercepting device.

SUMMARY OF THE INVENTION

The present invention provides a novel way of preventing skimming. For this purpose, the present invention provides a card feed unit for transferring a data carrier of card information of a multi-services cards, such as a bank card or credit card, to a reading head of a reading unit for at least reading out of card information, the card feed unit comprising:
  attachment means for attaching the card feed unit in an arrangement respective of the reading head that is suitable for transporting the data carrier of the card in the direction of the meeting head,
  a receipt position for receipt of the card into the card feed unit,
  a transfer assembly for transferring the card by means of the transfer assembly in the direction of the reading head, in which:
  the card feed unit is suitable for, during insertion of the card in the receipt position, receiving the card in the receipt position by means of an insertion operation with a direction of movement that, at least as seen in one direction, is substantially perpendicular to the readout direction of the card for preventing that the card is readable during the insertion operation.

An advantage of such a card feed unit is that the card is being received into the receipt position by means of a movement that is perpendicular to the longitudinal readout direction of the data carrier of the card. The results thereof is that during this operation, the data carrier cannot be read out by a reading head as the direction of movement does not allow for a longitudinal 'swipe' along the data carrier. Only after the card with the data carrier has been inserted into the receipt position, a longitudinal movement that would allow for a swipe is being performed. Therefore, a card feed unit according to the present invention provides for a new way of preventing skimming.

In a first preferred embodiment of a card feed unit according the present invention, the card feed unit comprises guiding elements for guiding of the card towards the receipt position via at least a guiding path. The guiding elements provide for limiting the possibilities of movement of the card in such a way that a natural movement is allowed for guiding the card into the receipt position. Furthermore, the guide elements provide for visibly indicating a natural way of inserting the card into the receipt position, while still forcibly maintaining the indicated direction of movement of the card during the insertion operation.

In a further preferred embodiment, the guiding path of the card comprises two directional components that are each perpendicular to a serial readout direction of the card. The application of this path also forcibly maintains the indicated direction of movement of the guard during the insertion operation.

As the movement of the card before and during the readout operation both needs to be in the perpendicular direction with respect to the data carrier and in the longitudinal direction with respect to the data carrier, card input unit preferably comprises a substantially arm-shaped, from the unit protruding, receipt member that defines at least a part of the receipt position. This arrangement allows for initially moving perpendicular to the readout direction of the data carrier and subsequently, after the card has been placed into the safe environment of the card feed unit a subsequently safe longitudinal movement towards the reading head of the card read unit. The concept of the arm protruding from the device enables this solution as the card can be inserted perpendicularly into the protruding part in order to be safely concluded into the device before the longitudinal movement starts.

Preferably a guiding channel is included for guiding of the card along at least a part of the path towards the reading head. Preferably this guiding channel is arranged inside the substantially arm shaped, from the unit protruding receipt member. According to this embodiment, a part of the card, more specifically the data carrier, is safely included into the channel after placing the card into the receipt position. The remainder of the card remains visible and accessible to the user for handling of the card.

In a further preferred embodiment the receipt member comprises signaling means for signaling of manipulative actions inflicted on the card feed unit. The card feed unit is intended to prevent misuse and abuse of card readers and therefore would be a target for manipulative actions in order for abusers to still be able to perform the skimming operations. Therefore, the signaling means provide a signal for indicating when such manipulative actions have been performed.

Preferably, the signaling means comprise an electrical detection loop for signaling of damage to the detection loop. Such a detection loop may be arranged inside the protruding receipt member. Therefore, when manipulative actions have been performed on the protruding receipt member, a signal would be available for e.g. shutting down the device.

A further preferable way of embodying the signaling means is by means of a fluid, such as a liquid or a gas, tight space for signaling the event of a fluid leak. This embodiment allows for keeping a gas at a certain pressure within the fluid tight space in for example the protruding receipt member. A sudden pressure dropped within the gas could be measured by a pressure sensor and an indication could be sent out for e.g. shutting down the device.

Preferably a container holding a certain amount of fluid material is connected to the space for keeping a long term substantially equal pressure, even when some of the fluid material slowly leaks from the space. The long term pressure may vary slightly but rather quick pressure difference indicative of tampering with the device will initiate a signaling. Another way of keeping a long term pressure is a cylinder with a piston under duress of e.g. a spring. Also the base plate is preferably provided with pressure channels linked to the space for holding the fluid. The further advantage of this feature is that even tampering with the base plate will trigger an alarm.

Another way of preventing manipulative actions to the card feed unit and/or the protruding receipt member is to prevent demolishing or damaging the device. To this end, the device preferably comprises at least a grinding retardant for retarding an attempt to grind through a part of the card feed unit, such as the card receipt member, in which the grinding retardants preferably comprise a ceramic material and or a hardened steel. A reason for providing this embodiment is that when the end piece of the protruding receipt member would be removed and replaced by another end piece, this replacing and please might include a reading head for a skimmer.

Sometimes a user accidentally inserts two cards into a card reader. In order to prevent this, a card feed unit according to a further embodiment comprises a throughput slot with a thickness that is less than twice the thickness of a standardized bank card, preferably less than 1.5 times the thickness of a standardized bank card.

Furthermore, e.g. an ATM device is used in outside environments. During cold weather periods, this might result in freezing of the card feed unit. In order to prevent such freezing, the card feed unit comprises preferably a heating member for heating the card feed unit, preferably the receipt member. A further advantage of such a card feed unit is that condensation of water may be prevented. Also, the formation of ice on the card feed unit or in the card feed unit, especially the channel may be prevented.

Preferably, the card feed unit comprises a drainage opening for draining of the guiding channel and or comprising a drainage channel leading up to the drainage opening. By means of this, any water entering the card feed unit may be expelled, preventing sabotage or wear, in order for its influence from being detrimental to the use.

In a further embodiment a free space for the data carrier is comprised in the card feed unit, such as comprising a deepening in the guiding channel, for preventing damage to the data carrier by scraping the data carrier surface. This deepening may also facilitate bringing the card into the channel at an angle as is described below.

In the card feed unit, preferably guiding elements comprise a second protrusion that is arranged substantially across of the guiding channel for, during the insertion operation of the card, keeping the card in the initially at an angle respective of the receipt position. Keeping the card at an angle with respect to the bottom of the channel is also a further way of preventing illegally reading out the data carrier during the insertion of the card. When the data carrier is at a, even small, distance from the bottom of the channel, this distance prevents reading out the data carrier effectively. However, this eventuality would only be able to occur upon the availability of reading heads that would be able to read out during a perpendicular movement and covering the whole of the data carrier during this movement. Such reading heads have not yet been known.

Tests have been performed with a card feed unit according to the present invention and the occasionally it might have occurred that a person could try to enter the card at an angle into the guiding channel while trying to slide it from the side. The guiding members would not allow such a way of sliding in the card that a user might be trying to force the card thereby damaging it. In order to make clear that such a movement is impossible, preferably, the card feed unit, especially the channel, comprises a blocking member for blocking of the insertion operation of the card when the card is inserted obliquely into the channel. When a corner of the card hits the blocking member, which may be a notch in the back wall of the channel, the card is abruptly stopped before such damage may occur thereby indicating to the user that this direction of movement is not intended before such damage may occur.

Preferably, the receipt member comprises an end part closing end of the channel that preferably provides an L-shaped ending to the receipt channel. This part of the L-shaped ending is partly responsible for indicating to the user how to card is to be inserted into the receipt position. Furthermore, this L-shaped ending is responsible for presenting a longitudinal movement of the card into the channel, thereby effectively preventing the possibilities for skimming by means of bringing a reading head off a skimmer into end of the channel. The data carrier would simply not reach that part of the channel.

A penetration prevention element for preventing the creation of a cavity for receiving an illegal reading head for reading out of the data carrier is a further feature for a further embodiment. This feature effectively presents the possibility to create such a cavity for positioning a skimmer reading head near the beginning of the channel, a position the card would pass in a longitudinal manner after placing it into the receipt position. Therefore, such a prevention element, such as a highly hardened steel shaft provides an additional bar against skimming.

In a further preferred embodiment, the receipt position is directly reachable by a to and fro moving reading head. This embodiment is intended for sliding a card, data carrier forward, into a slot. When sliding the card into the slot is way, it may not be read out by a skimming head. Thereafter, the data carrier may be read out by a moving legitimate reading head of the transaction machine.

In a further preferred embodiment, the receipt position is arranged in a sled that is movable to and fro for guiding of the card at least partly along a part of a path into the direction of the reading head. This embodiments is intended for sliding a card, data carrier forward, into the sled. As with the previous embodiment, the data carrier cannot be read out during the insertion movement. After the insertion movement, the sled will transport the card along a legitimate reading head.

The path of the sled may be substantially along a straight line. In case the path of the sled at least in part follows a curved path, a further level of security is achieved as the card may be entered into the device when the sled is at an angle. Therefore, reading out the data carrier when it is inserted is even less achievable by a skimmer.

Preferably, the card feed unit comprises driving means for moving the card, and or the sled, along at least a part of the path from the receipt position towards the reading head. Such driving means may diminish the need for a large remaining surfaces of the card sticking out of the card feed unit for inserting and picking out. Therefore, in the device, there is more space for physical fortifications against abuse.

A further aspect of the present invention relates to a card reading unit for reading out of card data from a data carrier of a bank card, comprising a reading head and a card feed unit according to the present invention. Such a card read unit has the benefit of the advantages as described in the above.

A further aspect of the present invention relates to a transaction machine, such as a payment device or an automated teller machine ATM, for performing of transactions while using a payment card, comprising a read out unit for reading out of card information from a data carrier of a payment card and comprising a card feed unit according to the present invention. Such a transaction machine has the benefit of the advantages as described in the above.

Related to this aspect it is most convenient to explain the use of the present invention in manned and unmanned environments. The example of the ATM machine is an example of use in an unmanned environment. The example of using the invention in a manned environment is for when with cash register a transaction device is used. Also in those environments skimming is possible and a threat. The present invention provides for safeguarding the transaction machine in such instances as well, e.g. by means of a swipe embodiment.

A further aspect of the present invention relates to a method for safely performing transactions while using a card feed unit and or machine according to the present invention, the method comprising steps for:
   providing of the card feed unit and a transaction machine,
   allowing a user to the transaction machine,
   while using the card feed device by the user, performing of a transaction. Such a method has the benefit of the advantages as described in the above.

Further advantages, features and details of the present invention will be described in greater detail with reference to the annexed drawings and based one or more preferred embodiments. The drawings show as follows.

DETAILED DESCRIPTION OF THE PREFERRED EMBODIMENTS

Figure 1:
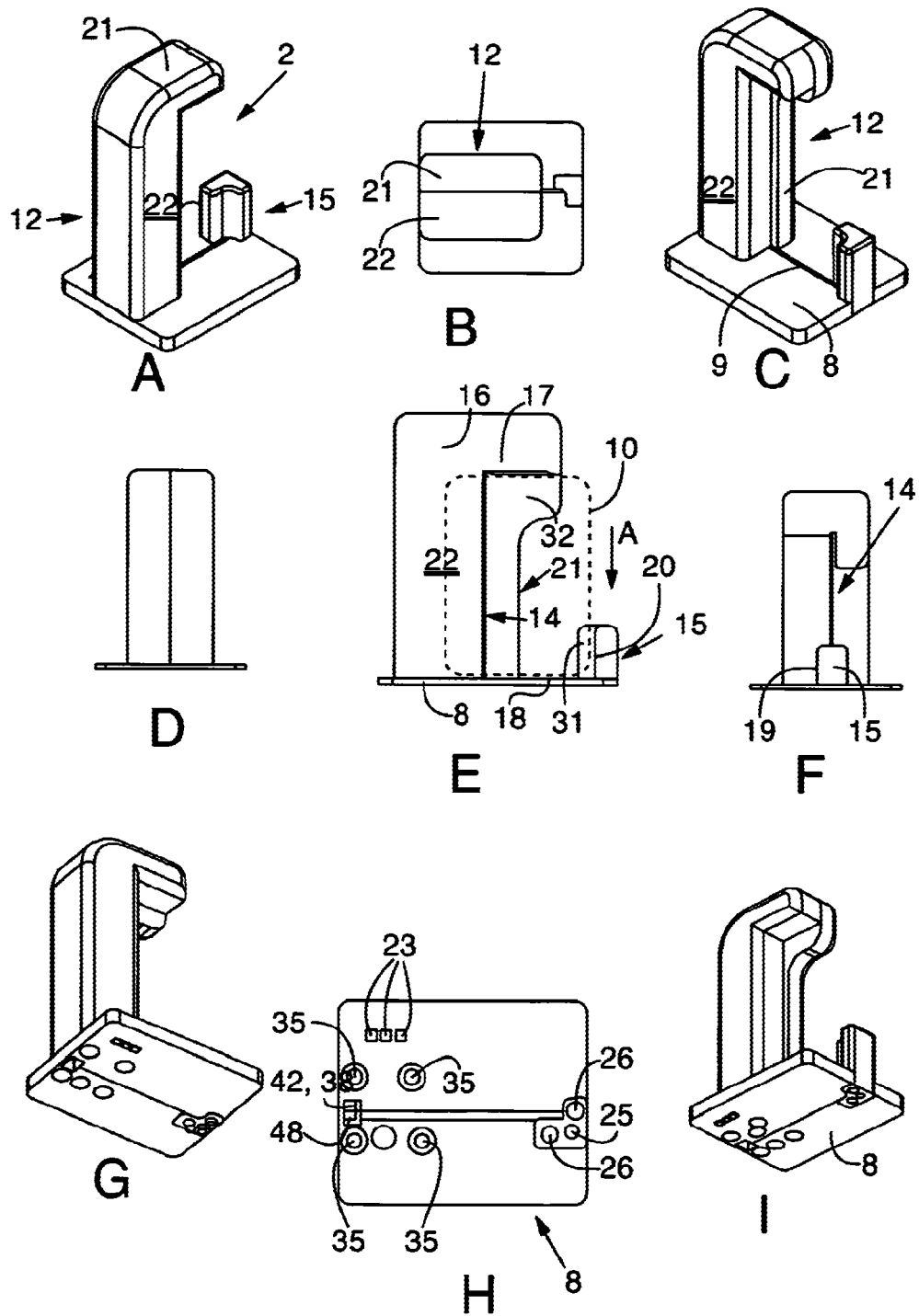
FIG. 1 is nine different views of a card feed unit in accordance with the present invention.

A first preferred embodiment (FIGS. 1-4) according to the present invention relates to a card feed unit 2, which is shown in 9 different views. The card feed the size comprises a base plate 8 comprising a slot 9 through which a card can be fed into a card reader that is arranged behind the base plate. The base plate may be mounted on a mounting plate (not shown) that is adapted for mounting on a specific ATM like device, each of which may have specific mounting requirements.

Protruding from the base plate 8, a guiding arm 12 is arranged in this embodiment. The guiding arm comprises a channel 14 in which a bank card may be inserted in order to be placed in the receipt position 10. When a bank card is in the receipt position 10, it may be moved in the direction of the arrow A in order to be passed through the slot 9 in the direction of the reading head of the card reader (not shown).

In order for the bank card to be positioned in the receipt position 10, it has to be placed into the channel 14 in between the side 18 of the base plate 8 and the inner wall 17 of the L-shaped end piece 16 of the arm 12. Also, the bank card has to be guided over the top part of the protrusion 15 that is arranged opposite of the channel 14. This requires a complex movement of the bank card. However, the receipt position of the bank card is made very clear by the constraints of the walls 17, 18 and 20, as well as by the top surface 31 of the protrusion 15 and the top surfaces 32 of the bottom half 21 of the arm 12. Because of these constraints, the receipt position 10 is very intuitively clear to the user. The open space between the L-shaped arm and the protrusion 15 allows for ample handling room of the hand resp., the fingers of the user placing the bank card to the receiving position 10.

The curved shape 59 of the surface 32 also provides an additional security effect in that this prevents placing a longitudinal reader or in other words a parallel skimhead to be placed along the channel over the length of the distance between plate 8 and the inner wall 17. To this end also additional protrusions 58 are envisioned.

Figure 2:
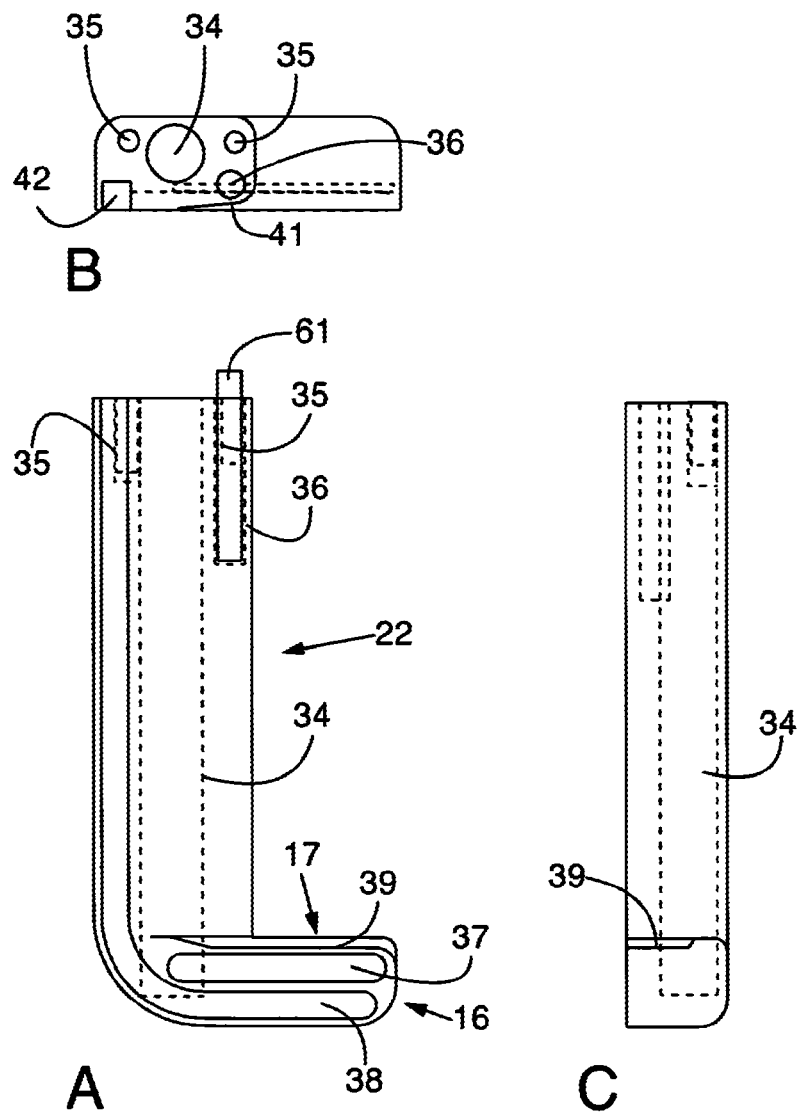
FIG. 2 is three different views of a top half of an arm of the card feed unit shown in FIG. 1.

The top half 22 of the arm 12 is shown in greater detail in FIG. 2. The top 22 is provided with bores 35 for allowing therein for fastening the arm to the base plate or the mounting plate. Furthermore, a work 34 is present for mounting of a ceramic shaft for preventing grinding through the arm, thereby preventing destroying the arm and preventing attaching a skimming device. A further tamper prevention is provided by bore 36 for allowing the insertion of a hardened steel shaft. The hardened steel pin 61 in the hole 36 prevents drilling into the arm at the location a reading head should be placed for allowing effective skimming. This hardened steel shaft prevents drilling a hole at that specific location into the arm.

The opening 42 leads to the channel 38 that extends along the L-shape of the top half 22 this L-shaped channel in the top half 22 is produced by means of milling, as is channel 37. Channel 38 is intended for placing an electrical loop for providing electrical detection means for detecting damage to the arm. The channel 37 is intended for a hard metal insert preventing damage to this and part of the arm.

The inner wall 17 of the end part 16 of the arm is provided with a slight widening 39 for allowing some extra play while placing the bank card into and/or removing the bank card from the receipt position 10. A further feature for allowing easier placing of the bank guard is provided by the slightly sloping upper wall 41 of the channel 14. The distance between de plate 8 and the inner wall 17 is preferably substantially the length of a bank card, or slightly larger to provide play. The reason for this is that the shorter this distance the less opportunity for placing a skimming head is present as the skimming head would need to be placed at a location where the head can skim the whole data carrier portion of the card.

Figure 3:
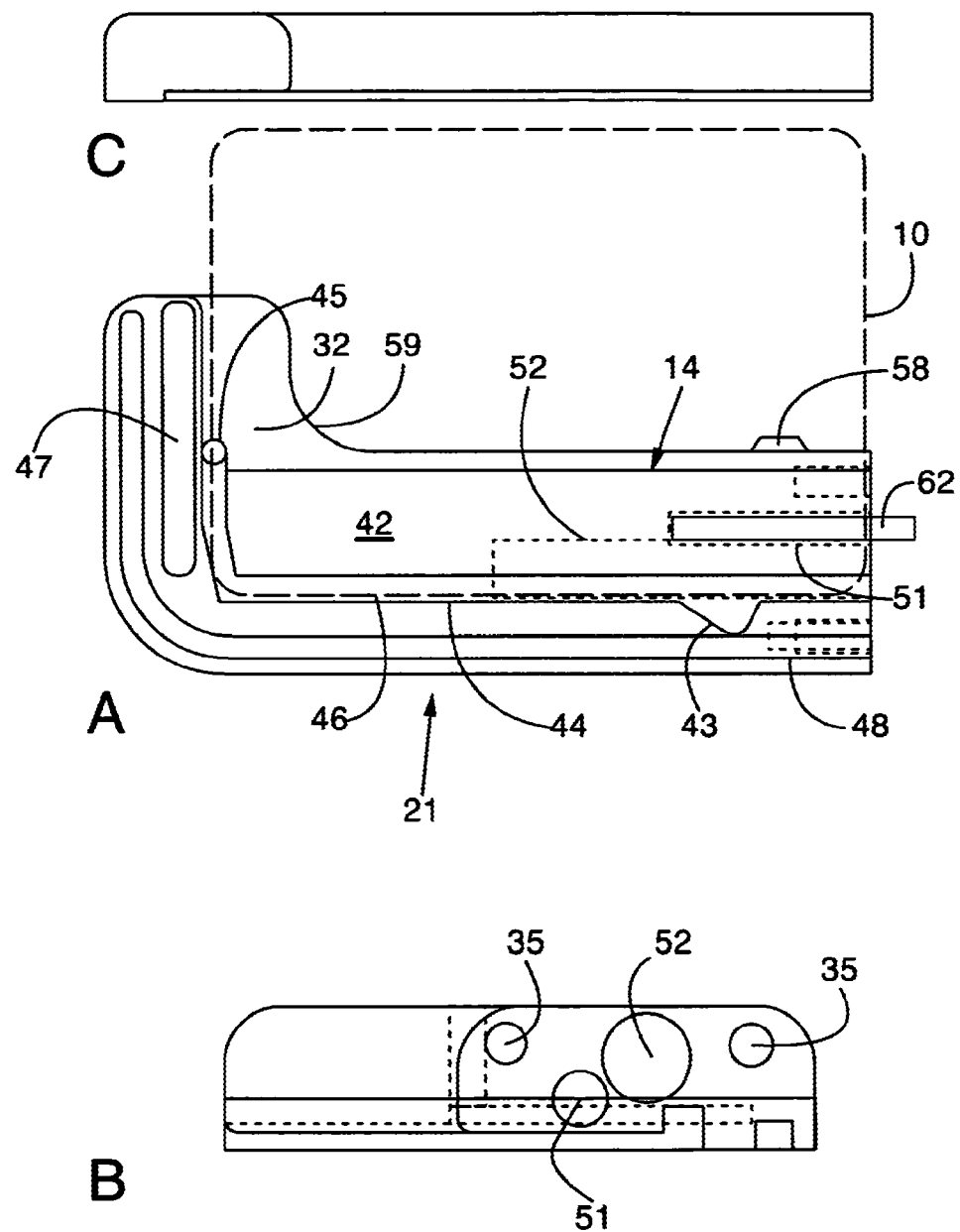
FIG. 3 is three different views of a bottom half of the arm of the card feed unit shown in FIG. 1.

The bottom half 21 of the arm 12 is shown in greater detail in FIG. 3. The channel 14 comprises a deepening 42 in order to prevent damage to the magnetic data carrier of the bank card. By interrupted lines, the receipt position 10 of the bank card is also shown in FIG. 3. In the back of wall 44 of the channel 14, the wrongful insertion stop 43 is shown. In case someone tries to obliquely insert a bank card horizontally in between the arm end part 16 and the protrusion 15, the far corner of the card will be trapped by insertion stop 43, thereby indicating the wrongful insertion expressly.

In order to prevent water to remain in the channel, the channel is provided with a water guiding deepening 46 and guiding the water to the through hole 45, which is intended for draining the water out of the channel. In the end part of the bottom half, a channel 47 is milled in order to receive a hard metal reinforcement of the bottom half. The hard metal reinforcement of the bottom half and the top half may be embodied as one reinforcement feeling both the space 47 and the space 37. The channel 48 is intended for receiving an electrical detection wire, similar to the purpose of channel 38, both of which may form one combined channel for the detection wires.

Also in the bottom half, the bores 35 serve the purpose of fastening holes. Bore 51 is intended for a hard metal reinforcement for prevention of micro milling or drilling a hole in the bottom half of the arm. The specific reason for this location of the bore 51 is that this location is exactly underneath the data carrier of the bank card. It is very important to present placing a skimming reading head underneath this data carrier, because of which is chosen to place the hard steel reinforcement at this location in the hole 51 specifically preventing the placement of a skimming reading head at that location. The hardened steel pin 62 in the hole 51 prevents drilling into the arm at the location a reading head should be placed for allowing effective skimming. A further bore 52 is present for allowing the placement of a heating element at this location for allowing the heating of the arm 12.

Figure 4:
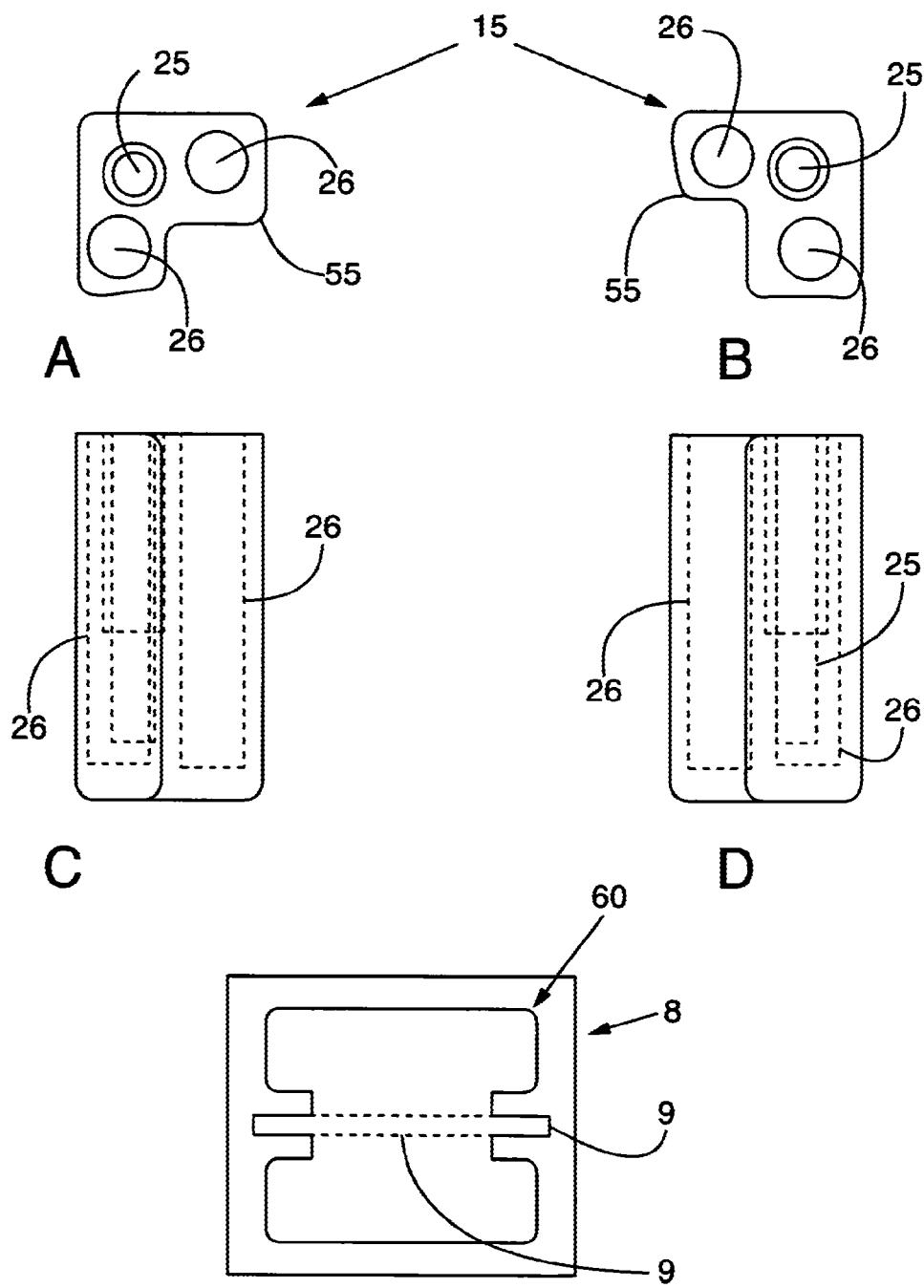
FIG. 4 is five different views of a protrusion of the card feed unit shown in FIG. 1.

In FIG. 4, the protrusion 15 is depicted in greater detail. Protrusion 15 is fastened by means of welding. Two bores 26 provide for the inclusion of detection loops in the protrusion as well as in the arm. A further bore 25 is intended for housing a temperature sensor. The edges 55 of the protrusion 15 are slightly rounded in order to prevent damage to the bank cards. A further optional feature of the base plate 8 is the light guidance means 23 (FIG. 1H) for guiding light of indicator lights of the adjacent cards reader in order to be visible to the user after the card feed unit 2 has been mounted.

The plate 8 may be provided with an opening 60 for allowing a user to manually take out the card from the card reader in case the card reader is unmotorized. The card will be guided by the parts of the slot 9 that remain at both ends. The opening 60 allows for two fingers, preferably the thumb and index, to be inserted into the card reader to grip the card for pulling the card out of the reader.

Figure 5:
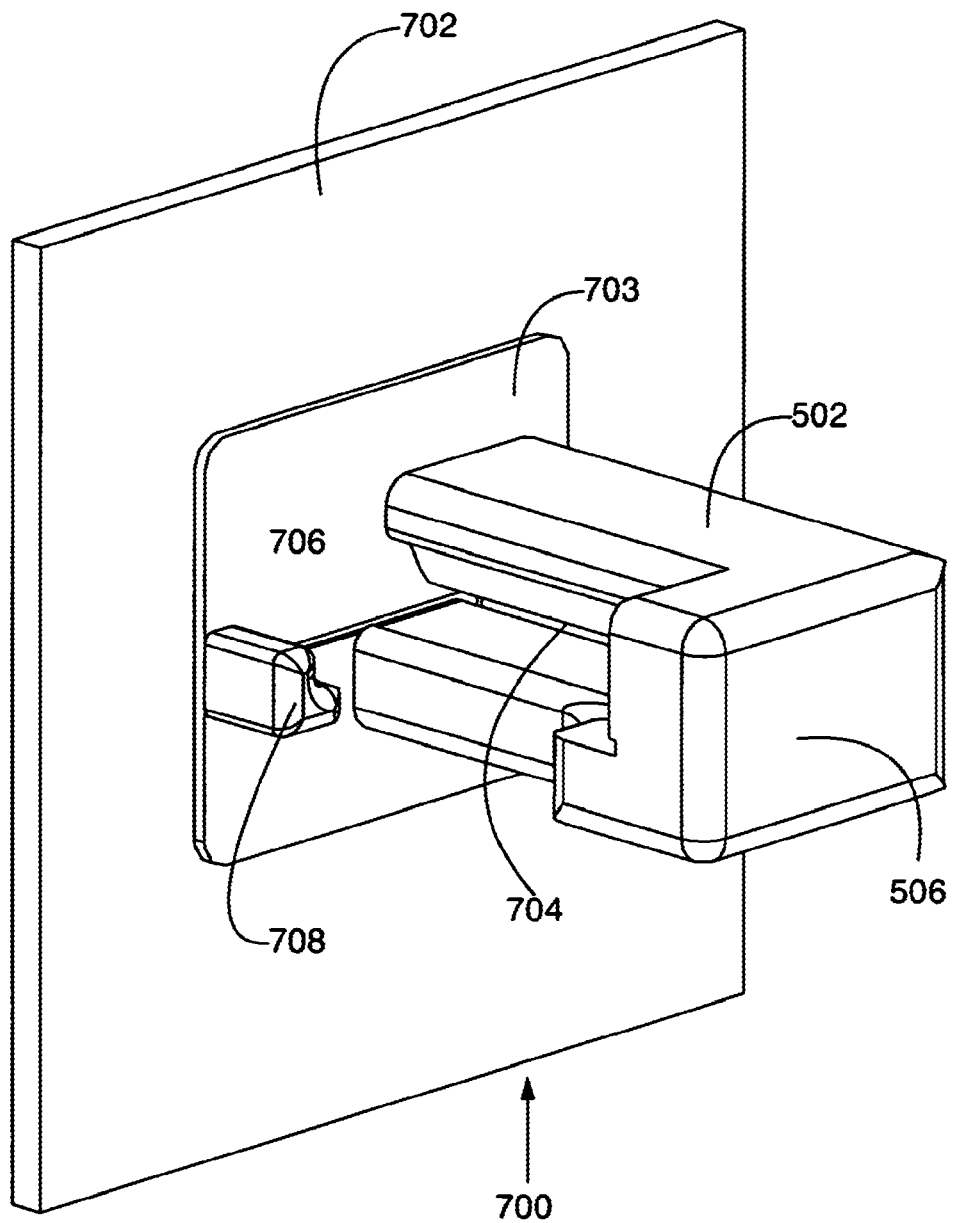
FIGS. 5, 6, and 7 are perspective, top, and transverse cross-sectional views of a second embodiment arm.
Figure 6:
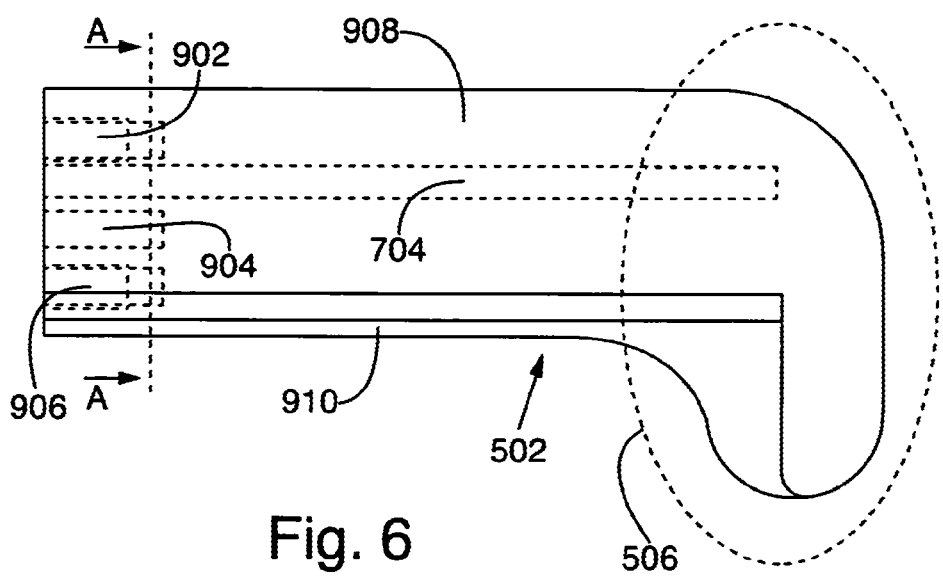
Figure 7:
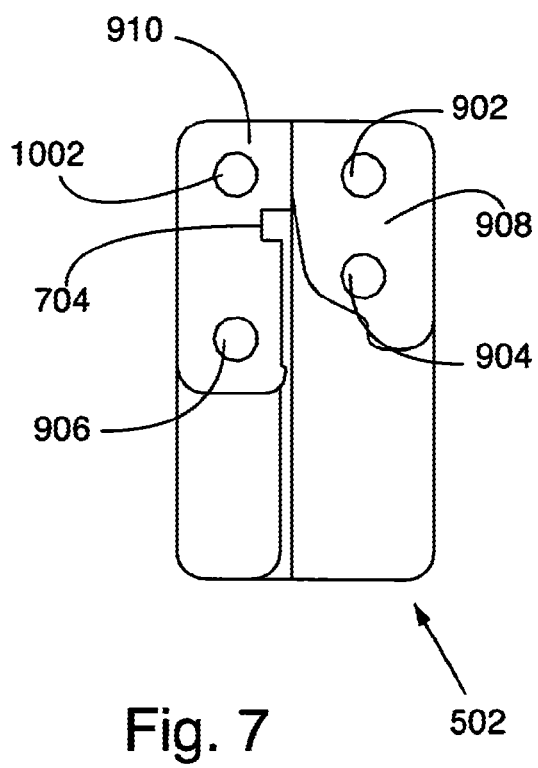

FIGS. 5, 6 and 7 comprise diagrams illustrating another embodiment of arm 502. FIG. 6 shows arm 502 as seen from its top, and FIG. 7 shows arm 502 in a transverse cross-section A-A as indicated in FIG. 6. Features 902, 904 and 906 and 1002 indicate threaded holes in arm 502 in order to securely attach arm 502 to base plate 702. Arm 502 is made from a top strip 908 and a bottom strip 910. Strips 908 and 910 are jointed. Channel 704 is accommodated in bottom strip 910 and is shielded by top strip 908. Remote end 506 of arm 502 is formed as an integral part of strips 908 and 910 when jointed. Remote end 506 is shaped so as to prevent card from being inserted into arm 502 in an orientation wherein strip runs parallel to the direction of the card's inserting. The rounded shape of remote end 506 has ergonomic advantages in that more or less sharp corners are absent. Also note the profile of top strip 908 that facilitates sliding card 106 into, and out of, arm 506.

If user interface of apparatus is exposed to the weather, a water drain may be provided in arm 502 so as to be able to draw off water that has entered arm 502 and has accumulated in channel 704. Water may enter arm 502 as a result of, e.g., rain or condensation. The water may then accumulate in channel 704. If the accumulated water freezes, apparatus 102 cannot be used anymore as ice is blocking channel 704.

If needed, a heating element can be used in arm 502, for example, in combination with a water drain, in order to prevent the forming of ice. In an embodiment of apparatus, arm 502 is positioned somewhat inclined with respect to the horizontal level, so as to have remote end 506 lower than the end near slot 706. The water in arm 502 then accumulates at the lowest location in arm 502, near remote end 506. A drain near remote end 506 draws off the water under the influence of gravity.

The drain may comprise one or more straight passages in the lower part of arm 502 in order to connect channel 704 to the outside world. Such a straight passage can simply be made by drilling. Alternatively, the drain is formed as a path more intricate than a straight hole, e.g., a labyrinth, in order to make accessing channel 704, from the outside and via the drain, more difficult. Note that a drain could in principle be used for guiding a reading head of a skimming device towards channel 704.

Now, when arm 502 is positioned so as to have remote end 506 lower than the other end of arm 502 near slot 706, a skimming reading head positioned in the channel at the drain, if possible at all, could not be used to capture the data at strip 110 of a card 106. The reason for this is, that only a portion of card 106 would be passing that specific location, if 5 at all. If deemed necessary, the drain is positioned strategically in arm 502 with respect to the electric wires or electrically conductive strips, mentioned above, that are used to monitor the physical integrity of arm 502.

Figure 8:
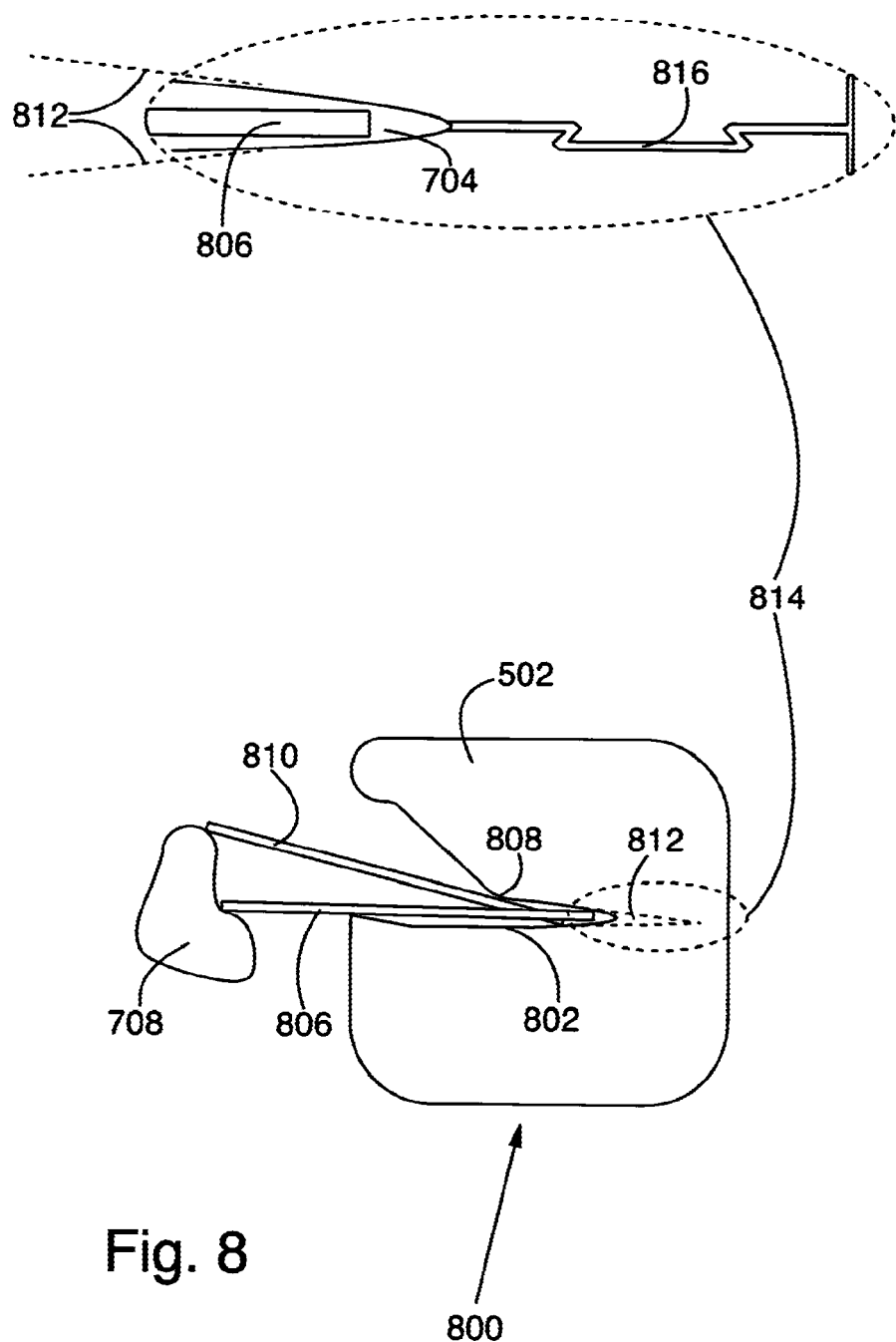
FIG. 8 is a transverse cross-section of the arm of FIGS. 5-7 used with the card feed unit of FIG. 1.

FIG. 8 is a diagram schematically illustrating a transverse cross-section 800 of arm 502 in the configuration of embodiment of FIG. 1. Cross-section 800 is taken in a plane perpendicular to the length of arm 502 and intersecting channel 704. A portion 802 forms part of a lower wall of channel 704. Portion 802 is slightly curved inwards so as provide a clearance for card 106 in order to reduce wear on strip 110 when card 106 is fully inserted into channel 704. That is, when card 106 has assumed the position as shown in FIG. 8 and as indicated in FIG. 8 with reference numeral 806, the clearance facilitates sliding card 106 into or out of slot 706. Also, curved portion 802 provides clearance for card 106 when being inserted or removed from channel 704 by the user. Portion 808 forms part of an upper wall of channel 704, and is curved outwards.

The curvature of portion 808 guides card 106 into channel 704 under control of protrusion 708 when card 106 is brought into a position indicated by reference numeral 810. Upper and lower walls of channel 704 are not strictly parallel in cross-section 800, but form an acute angle 812. As a result of the dimensions and material of a standardized magnetic card 106, the curvature of portion 804 has a radius of, e.g., 6 mm, and angle 806 is, e.g., 5 degrees. Region 814 is shown magnified to illustrate above features qualitatively in further detail. In the example shown, arm 502 is made from two parts attached to one another using a dovetail joint 816.

FIG. 8 also clarifies a further function of protrusion 708. The presence of protrusion 708 e.g. also hampers skimming if an array of multiple reading heads were used in a false front overlying the entrance to channel 704. The array could then be positioned in parallel to the direction of arm 502. The data captured from magnetic strip 110 by different skimming reading heads could be stitched together in order to extract relevant information.

Protrusion 708 and the entrance to channel 704 in arm 502 are profiled in a particular manner, which is explained as follows. Assume that card 106 is being inserted or removed from arm 502, magnetic strip 110 being held in parallel to arm 502. The cooperating profiles then determine the path and orientation of card 106 in a plane perpendicular to arm 502.

Note that positions 806 and 810 indicate that card 106 rotates around an axis parallel to magnetic strip 110 under control of the profiles of protrusion 708 and of arm 502. The controlled rotation sees to it that magnetic strip 110 does not touch the upper and/or lower surfaces of the entrance to channel 704. Accordingly, as a magnetic reading head of a skimming device needs to physically contact strip 110, without causing too much resistance, mounting a skimming device with parallel reading heads has become extremely difficult.

Figure 9:
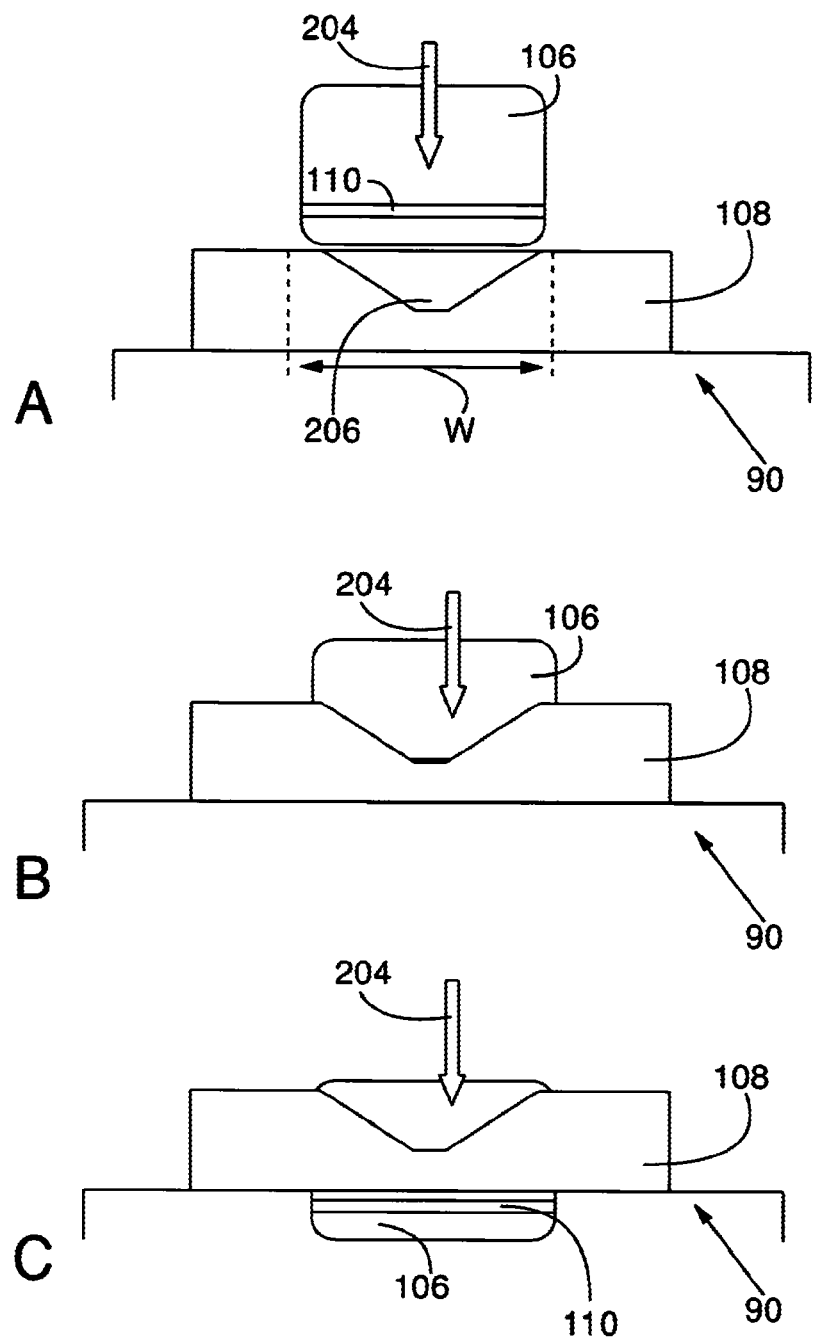
FIG. 9 is three different views of a card in various positions of a card feed unit in accordance with an embodiment of the invention.

FIG. 9 are block diagrams illustrating a first embodiment according to the invention. Reference numeral 204 indicates a direction wherein card 106 is being moved by the user to insert card 106 into receiving section 108. In this embodiment, receiving section 108 has a slot having a width W that is large enough for card 106 to pass through, longer end first. That is, the dimension of the slot allows inserting card 106 with strip 110 remaining parallel to the slot. In the invention, direction 204 differs substantially from the direction 116 of strip 110. Receiving section 108 may be provided with a profiled entrance for properly guiding card 106 during insertion and/or removal. In FIG. 9A, the user moves card 106 towards receiving section 108 in direction 204.

In FIG. 9B card 106 has been moved to such a position that strip 110 is obscured by receiving section 108. Note that there is not a single location, stationary with respect to receiving section 108, where a reading head of a skimming device could be mounted for intercepting strip 110 so as to capture data before strip 110 is guided via the slot into a reading area 90, as shown in FIG. 9C.

Once card 106 has reached the position as shown in FIG. 9C, or has fully moved inside receiving section 108, i.e., inside reading area 90, a reading head (not shown) can read the data stored in strip 110. In an embodiment, reading head is motorized and is activated when card 106 has reached a predetermined position relative to receiving section 108. This predetermined position is reached upon fully inserting the card 106 into receiving section 108, or after a known motorized mechanism (not shown) has accepted card 106 for further transport in direction 204. Reading head then traverses a path running in parallel to direction W. Alternatively, reading head is stationary, and apparatus has a mechanism, known in the art, (not shown) for automatically transporting card 106 for enabling to capture the data.

In another embodiment, reading head 114 is stationary, and the user is to manually remove card 106, that has been partially inserted, in a direction parallel to direction 116. For example, when card 106 has been manually inserted to the proper position into receiving section 108, card 106 interacts with a mechanical release mechanism (not shown) that then enables manually moving card 106 in a direction parallel to direction 116.

In this case, the width W of the slot is larger than the width of card 106 by a factor of preferably about two. In yet another embodiment, receiving section has a transport mechanism (not shown) within reading area 90 for rotating card 106 so as to align it with a conventional card reader that is oriented for receiving card 106, its shorter edge first.

After completion of the reading operation, the user may pull out card 106 in the direction anti-parallel to direction 204.

Figure 10:
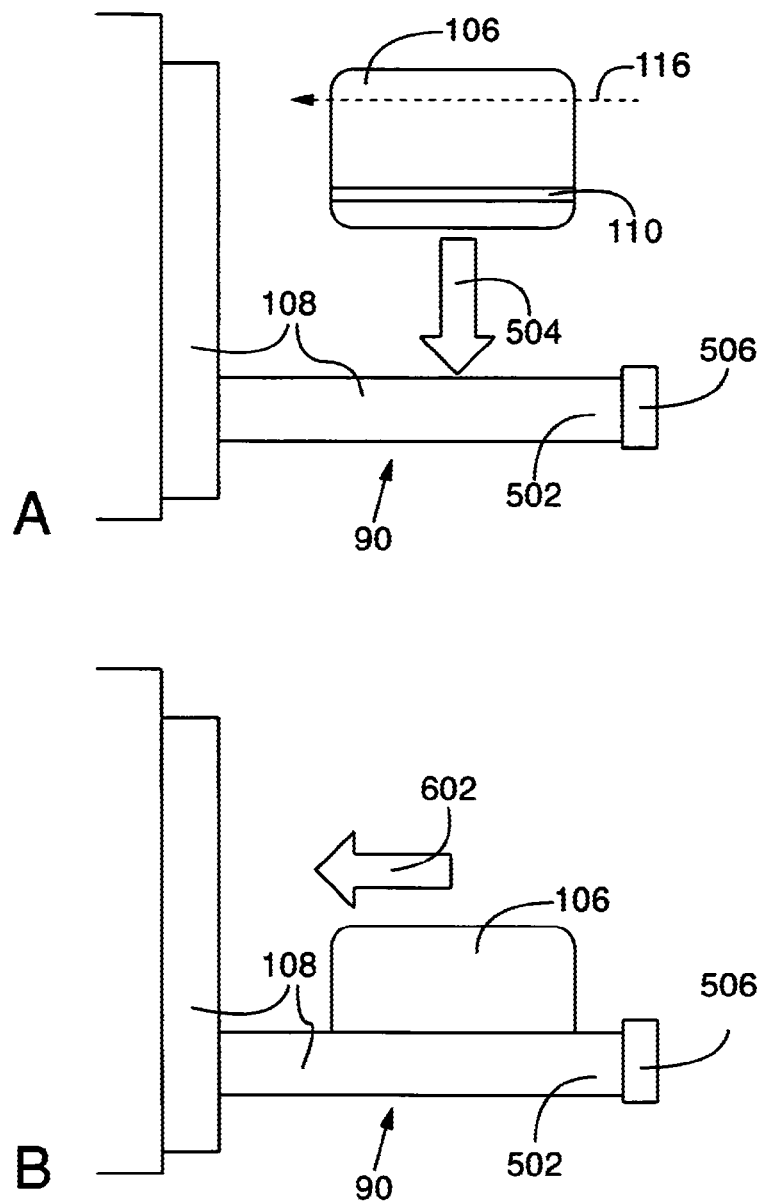
FIG. 10 is two different views of a card moving in an arm in an embodiment of the present invention.

FIGS. 10 A and B are block diagrams illustrating a further example of such a second embodiment. Receiving section 108 in this example comprises an arm 502 mounted on, and extending from, user interface 108. Arm 502 has a channel along at least part of its length. Card 106 can be inserted into this channel in the direction indicated by arrow 504. Note that the direction of arrow 504 is substantially perpendicular to the direction of magnetic strip 110. The depth of the channel is chosen so as to have arm 502 obscure strip 110 when card 106 has been inserted. After card 106 has thus been inserted into the channel, the user moves card 106 in the direction of an arrow 602 in order to insert card 106 into the slot of known apparatus.

As a result, the path traversed by strip 110 when moved in direction 602 lies entirely within reading area 90. In order to remove card 106, card 106 is slid back in a direction opposite to direction 602, and taken out of arm 502 in a direction opposite to direction 504.

Preferably, arm 502 is made of a suitable, hard material in order to resist tampering, and the channel in arm 502 is made just wide enough to manually slide card 106 into and out of the channel. Arm 502, or the part thereof forming the channel, may have its surface treated to facilitate the sliding of card 106 within the channel and/or to provide protection against the weather, dust and dirt, etc.

For example, the surface of the relevant part has a special surface coating or has been polished. A fraud, who seeks to install a skimming device, has to either modify arm 502 or have it replaced. The material of arm 502 is preferably such that it does not easily allow to be worked, e.g., for integrating a skimming device within the channel, without leaving clear traces. A false front accommodating a skimming device, positioned over arm 502 for intercepting the data, is not effective for the same reasons as explained above with reference to the embodiment of FIG. 9. That is, the direction of inserting card 106 into, or removing card 106 from, arm 502 is substantially perpendicular to the direction of strip 110.

Arm 502 is preferably provided with first means that determine the integrity of arm 502, and an ATM in which the invention is applied, is equipped with second means to trigger an alarm under control of the first means when arm 502 is being cut, e.g., with a grinder, or is subjected to operations that remove material from arm 502. For example, the first means comprises electric wires or electrically conductive strips, embedded within arm 502 or running just underneath its surface. The strips or wires are electrically isolated from the material forming arm 502 and run along the length of arm 502. The wires or strips are kept at a particular (low) voltage. When someone tampers with the arm, trying to cut it or remove material from it, one or more such wires or strips are damaged, which can be detected.

Alternatively, pairs of such wires or strips are connected at a remote end 506 of arm 502, i.e., the end farthest remote from receiving section 108, thus forming a loop. Apparatus has circuitry (not shown) that checks if a signal regularly or periodically sent into one end of the loop, returns via the other end. If there is no return signal, the alarm can be raised as the loop is interrupted. Similarly, the resistance of such a loop can be determined periodically, and a sudden change therein can be interpreted as an event that should trigger the alarm. For example, the alarm instantly disables ATM (not shown) or a card reader part thereof, thus rendering moot all card interactions with ATM. If ATM has a motorized card reader, the alarm is used to, e.g., switch off the power supply to the motorized card reader, switch off the card reader, or provide an alarm indication to the user.

Furthermore, the wires or strips are arranged close to the drain, so that they will be affected if someone tries to increase the interior diameter of the drain with a file or with a drill. FIGS. 11, 12, 13 and 14 illustrate an example of a further embodiment 1100 of the invention, in a longitudinal cross-section, applicable to swipe card readers. As known, a conventional swipe card reader enables the user to swipe card 106 along an open channel past a reading head. Card 106 is entered into the channel at one open end, swept past the reading head mounted in the channel, and taken out of the channel at the other open end, all in one run. It is fairly easy to put a skimming reading head at or in the channel near one or near both of the ends. The invention provides anti-skimming measures for swipe readers as follows, based on the general theme of the invention as discussed above.

Figure 15:
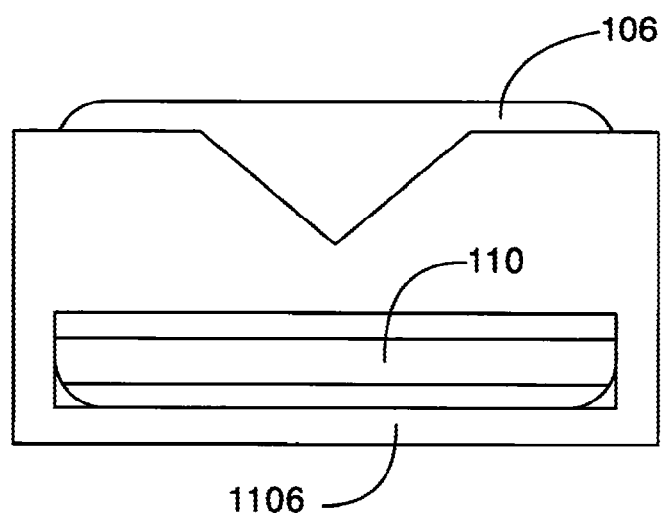
FIG. 15 is an isolated view of the sled and card shown in FIGS. 11-14.
Figure 16:
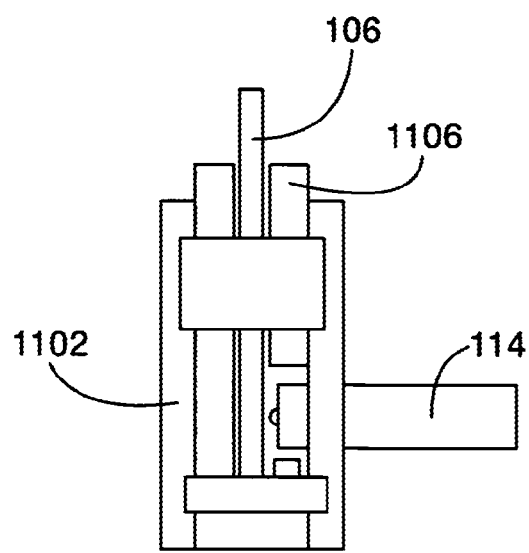
FIG. 16 is an end view of the sled and card feed unit shown in FIGS. 11-14.

Embodiment 1100 has a receiving section 108 with an elongated portion 1102 having a channel 1104. Reading head 114 is mounted in channel 1104. Receiving section 108 further comprises a sled 1106 that is constrained so as to only run within channel 1104. Sled 1106 is constrained by means of, e.g., giving sled 1106 and channel 1104 matching cross-section profiles in a plane transverse to channel 1104. The matching profiles prevent sled 1106 from moving out of channel 1104. Sled 1106 is configured for containing card 106 so as to leave magnetic strip 110 exposed to reading head 114, when card 106 is fully inserted into sled 1106. FIGS. 15 and 16 give an example of such profiles and illustrate that card 106 is positioned in sled 1106 so as to leave strip 110 exposed to reading head 114. Operation is as follows.

Figure 11:
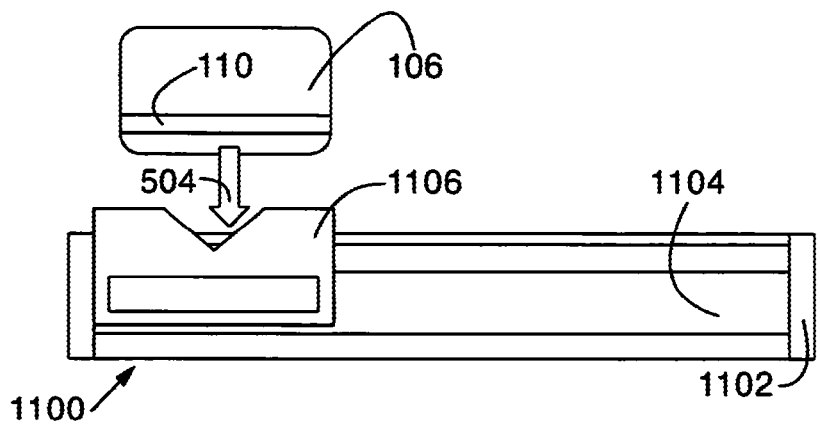
FIGS. 11-14 are different views of movement of a card in an embodiment of the present invention.
Figure 12:
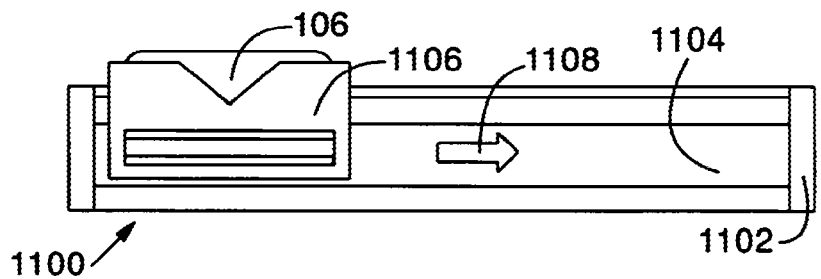
Figure 13:
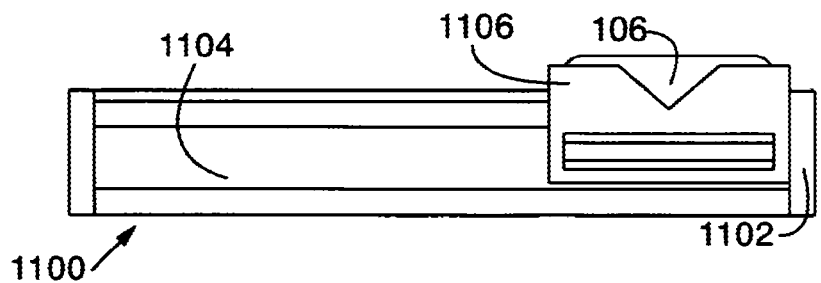
Figure 14:
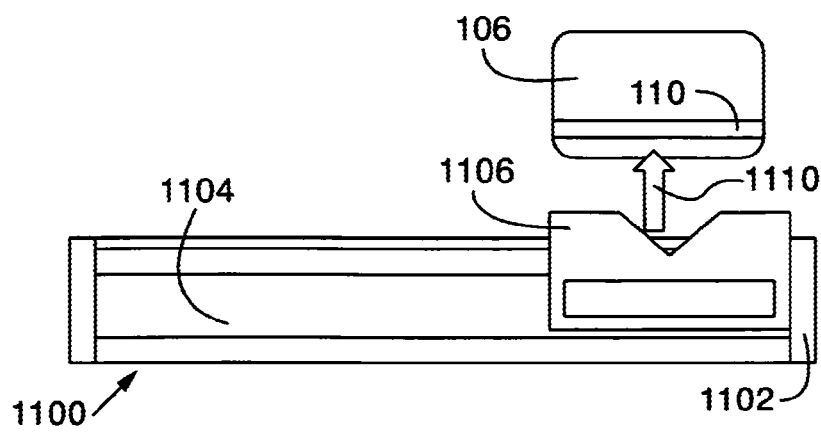

In FIG. 11, card 106 is being inserted into sled 1106 in direction 504, maintaining strip 110 oriented in parallel to channel 1104. In FIG. 12, card 106 has been fully inserted into sled 1106. Note that strip 110 is not obscured by sled 1106. Next, the user moves card 106 and sled 1106 to the other end of channel 1104, in the direction of an arrow 1108, and past reading head 114 (not shown) mounted in a wall of channel 1104. As sled 1106 leaves strip 110 exposed, reading head 114 is enabled to capture the data stored in strip 110. In FIG. 13, the motion of sled 1106 is halted at the other end of channel 1104. In FIG. 14, the user removes card 106 from sled 1106 in a direction 1110 that runs perpendicular to the main dimension of strip 110. A spring or another mechanism (not shown) can be provided in receiving section 108 to automatically return sled 1106 to the position as shown in FIG. 11 when the user removes card 110 from sled 1106 or when the user releases the assembly of sled 1106 and card 106.

Embodiment 1100 could be made by mounting sled 1100 in a first profiled segment of channel 1104, and securely mounting a second slotted segment over the first portion accommodating sled 1106, so as to lock up sled 1106 between the first and second segments. A fraud may want to position a skimming device over the top part of sled 1106 through which card 106 is received. Note that sled 1106 has a profiled top part. In this case, the front has a recess to accommodate the user's thumb and index finger.

Figure 17:
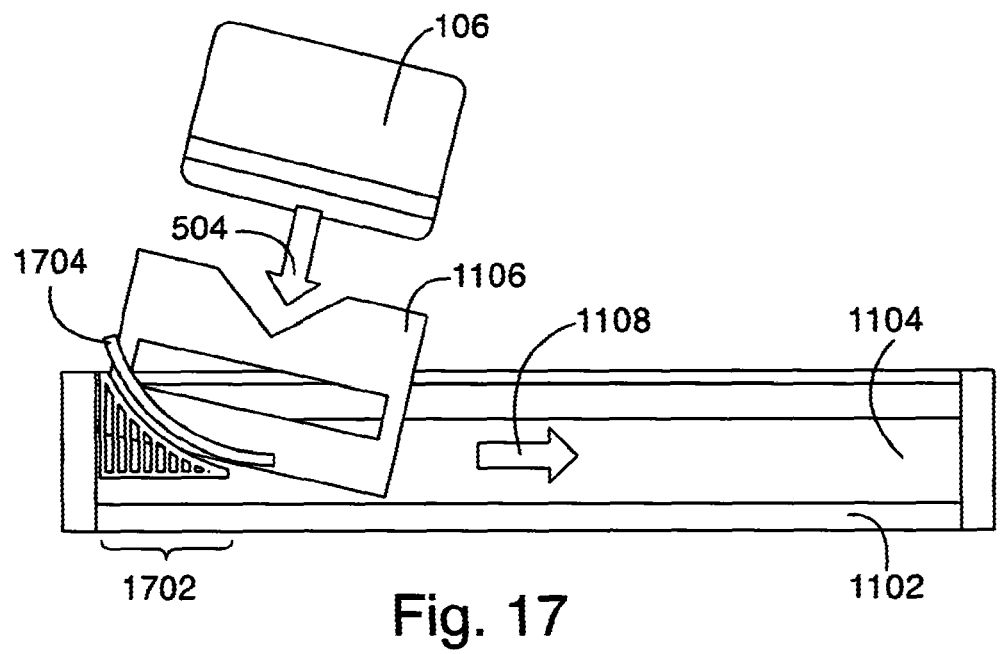
FIG. 17 is a variation of the card feed unit shown in FIGS. 11-14.

The profiled top part makes it rather difficult to design an inconspicuously looking false front and position it over the receiving section 108. In a variation on the theme of FIGS. 11-16 is illustrated in FIG. 17. Note that the path, along which card 106 and sled 1106 is being swiped in the configuration of FIGS. 11-16, is a straight line. In order to swipe card 106 along a straight path, the user typically has to use both wrist and elbow. For ergonomic reasons, therefore, it may be more comfortable to the user if the path, along which card 106 is to be swiped, is properly curved so as to be able to swipe card 106 with only a movement of the wrist.

FIG. 17 illustrates that sled channel 1104 is profiled in the direction of sliding, indicated by arrow 1108, so as to have sled 1106 change its orientation during the sliding. For example, channel 1104 has a run-in region 1702 with a specific profile and sled 1106 has a ridge 1704 with a matching profile so as to tilt sled 1106 with respect to direction 1108 when residing in this region. A further matching profile (not shown) in run-in region 1702 prevents sled 1106 from being tilted out of channel 1104. The tilted position facilitates the inserting of card 106 into sled 1106.

When the user then slides card 106, contained within sled 1106, in the direction of arrow 1108, sled 1106 assumes a horizontal position in the area of reading head 114 (not shown here). A similar profile may be provided at the other end of channel 1104 in order to tilt sled 1106. An elastic buffer may be mounted between sled 1106 and channel 1104 so as to absorb the shock of sled 1106 being slapped against channel 1104. Sled 1106 could be provided with an elastically mounted runner, for example. The elastic buffer reduces the shock to the user's wrist, when inserting card 106 into sled 1106 and swiping sled 1106, containing card 106, somewhat enthusiastically along channel 1104.

In FIGS. 11-17, sled 1106 is shown to move within channel 1104. In another embodiment (not shown), sled 1106 moves over and parallel to channel 5 1104. Sled 1106 is then configured so as to maintain card 106 in such a manner that only the portion of card 106 accommodating magnetic strip 110, is moving within channel 1104. This particular implementation is relevant to the installed base of existing swipe readers. A dedicated front is then positioned over the channel of the existing swipe reader. The dedicated front includes guiding rails or grooves, which constrain the movement of sled 1106 to a path parallel to channel 1104, while maintaining magnetic strip 110 of card 106 within the relevant segment of channel 1104.

Figure 18:
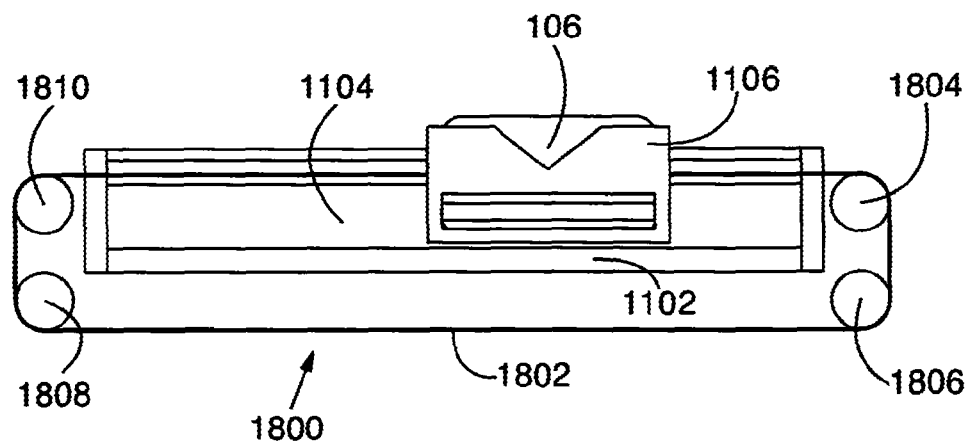
FIG. 18 is another variation of the card feed unit shown in FIGS. 11-14.

FIG. 18 is a diagram illustrating an option to have sled 1106 attached to a flexible sealing ribbon or cable 1802 that covers channel 1104. Sled 1106 may have a top part that overlaps elongated portion 1102 so as to cover channel 1104 at the location of sled 1106. Ribbon or cable 1802 runs over guiding means, here wheels 1804, 1806, 1808 and 1810, so as to remain taut and aligned with channel 1104.

The feature indicated above by reference numeral 1106 is referred to as "sled". It is clear that, for example, a cart or another vehicle could be used instead. What is important here is that sled or cart 1106 can be made to move within channel 1104 without too much effort on the part of the user. The term "sled" as used herein is to be interpreted as covering the concept of "cart" as well.

In the above, the present invention is described with reference to one or more preferred embodiments. Several aspects of several distinct preferred embodiments are described in the above. Furthermore, the features of distinct embodiments are deemed described in combination with each other in order to provide a description of all combinations that are considerable within the scope of this description by an expert of the field. The above disclosure these preferred embodiments are not limiting to the scope of protection of this document. The rights sought are determined in the annexed claims.

The invention claimed is:

1. A card feed unit for transferring a data carrier for card information of a multi-services card towards a reading head of a reading unit for at least reading out of card information, the card feed unit comprising:
   attachment means for attaching the card feed unit in an arrangement respective of the reading head that is suitable for transporting the data carrier of the card in the direction of the reading head,
   a receipt position for receipt of the card, and
   a transfer assembly for transferring the card by means of the transfer assembly in a transfer direction of the reading head, in which:
   the card feed unit is suitable for, during insertion of the card in the receipt position, receiving the card in the receipt position by means of an insertion operation with a direction of movement that, at least as seen in one direction, is substantially perpendicular to a readout direction of a magnetic stripe of the card for preventing that the card is readable during the insertion operation, wherein the readout direction and the transfer direction are both substantially in the plane of the card during the transferring, and the insertion operation is performed at an insertion side of the card feed unit.

2. The card feed unit according to claim 1, comprising guiding elements for guiding of the card towards the receipt position via at least a guiding path.

3. The card feed unit according to claim 2, in which the guiding path of the card comprises two directional components that are each perpendicular to a serial readout direction of the card.

4. The card input unit according to claim 1, comprising a substantially arm-shaped, from the unit protruding, receipt member that defines at least a part of the receipt position.

5. The card feed unit according to claim 2, comprising a guiding channel for guiding of the card along at least a part of the guiding path towards the reading head.

6. The card feed unit according to claim 4, in which the receipt member comprises signaling means for signaling of manipulative actions inflicted on the card feed unit.

7. The card feed unit according to claim 6, in which the signaling means comprise an electrical detection loop for signaling of damage to the detection loop.

8. The card feed unit according to claim 6, in which the signaling means comprise a fluid, such as a gas and a liquid, tight space for signaling the event of a fluid leak.

9. The card feed unit according to claim 1, comprising at least a grinding retardant for retarding an attempt to grind through a part of the card feed unit, in which the grinding retardants preferably comprise a ceramic material and/or a hardened steel.

10. The card feed unit according to claim 1, comprising a throughput slot with a thickness that is less than twice the thickness of a standardized bank card.

11. The card feed unit according to claim 1, comprising a heating member for heating the card feed unit, a temperature sensor for a temperature control, or both.

12. The card feed unit according to claim 5, comprising a drainage opening, a drainage channel, or both for draining of the guiding channel.

13. The card feed unit according to claim 1, comprising a free space for the data carrier, including a deepening in the guiding channel, for avoiding damage to the data carrier.

14. The card feed unit according to claim 2, in which the guiding elements comprise a protrusion that is arranged substantially across of the guiding channel for, during the insertion operation of the card, keeping the card initially at an angle respective of the receipt position.

15. The card feed unit according to claim 1, comprising a blocking member for blocking of the insertion operation of the card when the card is inserted obliquely into the channel.

16. The card feed unit according to claim 1, in which the receipt member comprises an end part closing end of the channel that preferably provides an L-shaped ending to the receipt channel, in which preferably the location of the L-shaped ending is definable by the length of a bank card.

17. The card feed unit according to claim 1, comprising penetration prevention elements for preventing the creation of a cavity for receiving an illegal reading head for reading out of the data carrier.

18. The card feed unit according to claim 1, in which the receipt position is directly reachable by a to and fro moving the reading head.

19. The card feed unit according to claim 1, in which the receipt position is arranged in a sled that is movable to and fro for guiding of the card at least partly along a part of a path in the direction of the reading head.

20. The card feed unit according to claim 19, in which the path of the sled is substantially along a straight line, at least in part follows a curved path, or both.

21. The card feed unit according to claim 1, comprising driving means for moving the card, the sled, or both along at least a part of the path from the receipt position towards the reading head.

22. A card reading unit for reading out of card data from a data carrier of a bank card, comprising a reading head and a card feed unit according to claim 1.

23. A transaction machine, such as a payment device or an automated teller machine ATM, for performing of transactions while using a payment card, comprising a readout unit for reading out of card information from a data carrier of a payment card and comprising a card feed unit according to claim 1.

24. A method for safely performing transactions while using a card feed unit and/or machine according to claim 1, the method comprising steps for:
 providing of the card feed unit and a transaction machine,
 allowing a user to use the transaction machine,
 while using the card feed device by the user, performing of a transaction.

\* \* \* \* \*